United States Patent
Kawai

(10) Patent No.: US 6,242,087 B1
(45) Date of Patent: Jun. 5, 2001

(54) MULTILAYER STRUCTURE AND PROCESS FOR PRODUCING THE SAME

(75) Inventor: Hiroshi Kawai, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/555,516

(22) PCT Filed: Dec. 5, 1999

(86) PCT No.: PCT/JP99/05465

§ 371 Date: Jun. 7, 2000

§ 102(e) Date: Jun. 7, 2000

(87) PCT Pub. No.: WO00/20211

PCT Pub. Date: Apr. 13, 2000

(30) Foreign Application Priority Data

Oct. 7, 1998 (JP) .................................. 10/285010
Oct. 7, 1998 (JP) .................................. 10/285011

(51) Int. Cl.[7] ............... B32B 27/10; B32B 27/30
(52) U.S. Cl. ............ 428/336; 428/514; 428/516; 428/520; 428/522; 524/394; 524/405; 524/503
(58) Field of Search ................... 428/511, 514, 428/516, 520, 522, 336, 34.2, 34.3, 35.4, 36.6, 36.7; 524/503, 394, 405

(56) References Cited

U.S. PATENT DOCUMENTS

| 4,619,849 | * | 10/1986 | Anzawa et al. | 428/35 |
| 4,810,755 | * | 3/1989 | Akazawa et al. | 525/285 |
| 5,059,459 | | 10/1991 | Huffman | 428/34.2 |
| 5,118,743 | | 6/1992 | Yonezu et al. | 524/287 |
| 5,849,376 | * | 12/1998 | Oishi et al. | 428/34.9 |

FOREIGN PATENT DOCUMENTS

| 59-192564 | 10/1984 | (JP) . |
| 1-066262 | 3/1989 | (JP) . |
| 4-234645 | 8/1992 | (JP) . |
| 11060874 | * 3/1999 | (JP) . |

* cited by examiner

Primary Examiner—D. S. Nakarani
Assistant Examiner—Elena Tsoy
(74) Attorney, Agent, or Firm—Oblon, Spivak, McClelland, Maier & Neustadt, P.C.

(57) ABSTRACT

Disclosed are a multilayer structure produced through co-extrusion of a multilayer melt that comprises a layer of an ethylene-vinyl alcohol copolymer (EtOH) resin composition containing from 100 to 5000 ppm, in terms of boric acid ($H_3BO_3$), of a boron compound, from 100 to 1000 ppm, in terms of the free acid, of a carboxylic acid and/or its salt, and from 50 to 300 ppm, in terms of the metal, of an alkali metal salt, and having an ethylene content of from 25 to 45 mol % and a degree of sanctification of at least 99%, and a layer of a carboxylic acid-modified polyolefin resin adjacent thereto; and a multilayer structure produced through co-extrusion of a multilayer melt that comprises a layer of an EVOH resin composition containing from 10 to 50 ppm, in terms of the metal, of a salt of a metal of Group 2 of the Periodic Table, and having an ethylene content of from 25 to 45 mol % and a degree of saponification of at least 99%, and a layer of a carboxylic acid-modified polyolefin resin adjacent thereto; processs for producing them; and resin compositions suitable to them. The multilayer structures comprising a layer of the EVOH resin composition and a carboxylic acid-modified polyolefin resin layer adjacent thereto have the advantages of improved thermal stability (long-run workability) in their production, especially in producing them through co-extrusion at high temperatures, improved co-extrusion molding stability especially in high-speed molding lines, and improved interlayer adhesiveness.

29 Claims, No Drawings

MULTILAYER STRUCTURE AND PROCESS FOR PRODUCING THE SAME

TECHNICAL FIELD

The present invention relates to multilayer structures which are produced through co-extrusion of a multilayer melt that comprises a layer of an ethylene-vinyl alcohol copolymer (hereinafter often referred to as EVOH) resin composition and a layer of a carboxylic acid-modified polyolefin resin adjacent thereto and which have the advantages of improved thermal stability (long-run workability) in their production, especially in producing them through co-extrusion at high temperatures, improved co-extrusion molding stability especially in high-speed molding lines, and improved interlayer adhesiveness, and also relates to a process for producing them, and to resin compositions suitable to them.

BACKGROUND ART

EVOH is a useful polymer material having good oxygen barrier properties, oil resistance, antistatic properties and mechanical strength, and is widely used for various wrapping and packaging materials such as films, sheets, containers, etc. In case where EVOH is used for various wrapping and packaging materials, not only its capability for the intended applications but also its macroscopic conditions including slight discoloration, pinholes, fish eyes, streaks and surface roughening, as well as its transparency shall be taken into consideration.

EVOH has some problems. When molded in melt, it is often discolored, and its moldings often have pin holes, fish eyes and streaks and their surfaces are often roughened. To solve the problems, various methods such as those mentioned below have heretofore been proposed.

In general, EVOH is obtained by saponifying an ethylene-vinyl acetate copolymer with a caustic alkali added thereto. However, when the resulting saponified product is directly molded in melt, it is readily pyrolyzed. As a result, its melt viscosity is greatly reduced and, in addition, it is noticeably discolored. Therefore, directly using the saponified product is impossible. To solve the problem, many methods have been proposed. For example, EVOH could be improved in some degree by fully washing it with water or by dipping it in an acid or an acid solution, as so described in Japanese Patent Publication No. 37664/1971, Japanese Patent Laid-Open Nos. 25048/1973, 88544/1976, 88545/1976, Japanese Patent Publication No. 19242/1980, etc.

Some types of metal salts are extremely effective for improving the thermal stability of EVOH, and adding a metal salt to EVOH to improve the melt moldability of EVOH is disclosed, for example, in Japanese Patent Laid-Open Nos. 954/1977, 955/1977, 41204/1981, etc.

Adding olefins, vinylsilane-type compound-copolymerized polyolefins and the like to EVOH to remove streaks from EVOH moldings owing to their elastic effect is disclosed in Japanese Patent Laid-Open No. 197138/1991.

In Japanese Patent Laid-Open No. 66262/1989 (USP 5,118,743), described is an EVOH resin composition that contains from 5 to 500 ppm, in terms of the metal, of a salt of a metal of Group 2 of the Periodic Table, from 20 to 2000 ppm of an acidic substance having a boiling point of not lower than 180° C., and from 100 to 2000 ppm of an acidic substance having a boiling point of not higher than 120° C.

In that patent publication, boric acid is referred to for the acidic substance having a boiling point of not lower than 180° C., and acetic acid is for the acidic substance having a boiling point of not higher than 120° C. However, these are among a large number of compounds exemplified in the publication. The content of the salt of a metal of Group 2 of the Periodic Table in the resin composition shown in the Examples is 100 ppm or more, in terms of the metal, and it is far larger than the content thereof that may be preferred for the composition of the present invention.

When the EVOH composition processed according to the proposed method is molded in an ordinary melt extrusion process (at an extrusion temperature higher by about 20° C. than the melting point of EVOH), its moldability could be improved in some degree. However, when it is molded under severe conditions, for example, at a temperature higher by 30° C. or more, especially by 50° C. or more, than the melting point of EVOH, it is noticeably degraded in the extrusion molding machine. As a result, the molded films will have many fish eyes and streaks, and their appearances are bad. After all, practicable moldings could not be obtained.

Co-extrusion of EVOH with other thermoplastic resins to produce multilayer structures has been popularized. Multilayer structures require interlayer adhesiveness between the EVOH layer and the adjacent resin layer, for which, therefore, needed is EVOH capable of ensuring the interlayer adhesiveness and having high-level melt stability, especially improved, long-lasting melt stability even at high temperatures. From this viewpoint, the properties of various types of EVOHs mentioned above are unsatisfactory.

In case where EVOH is extruded and molded at a high speed in order to ensure good productivity, it is often advantageous to lower its melt viscosity. This is for increasing the resin output at a predetermined level of energy applied. In such high-speed extrusion, the resin will have to be melted and molded at high temperatures, at which, however, the resin melt will be greatly degraded.

In particular, in case where a multilayer melt containing EVOH is coated on a substrate such as paper or the like, the EVOH layer to be formed must be thin and uniform so as to reduce the production costs and to ensure the gas barrier properties of the layered structures. In that case, the resin will be much degraded and its moldings will have many defects.

In Japanese Patent Laid-Open No. 192564/1984, disclosed is a laminate structure comprising a layer of boric acid-containing EVOH and a layer of a carboxylic acid-modified polyolefin. In this, boric acid is added to EVOH so as to improve the interlayer adhesiveness of the laminate structure. Nothing is referred to in the patent publication, relating to the melt stability of EVOH. In addition, nothing is referred to therein, relating to any other minor components except boric acid that may be added to EVOH.

In Japanese Patent Laid-Open No. 234645/1992, disclosed is co-extrusion coating of a multilayer melt that comprises EVOH and an acid-modified polyolefin, on a paper substrate. In this, however, nothing is referred to, relating to the preferred condition of EVOH.

In the background noted above, the object of the present invention is to provide multilayer structures which are produced through co-extrusion of a multilayer melt that comprises a layer of an ethylene-vinyl alcohol copolymer (hereinafter often referred to as EVOH) resin composition and a layer of a carboxylic acid-modified polyolefin resin adjacent thereto and which have the advantages of improved thermal stability (long-run workability) in their production, especially in producing them through co-extrusion at high temperatures, improved co-extrusion molding stability especially in high-speed molding lines, and improved interlayer adhesiveness, and also to provide a process for producing them, and resin compositions suitable to them.

DISCLOSURE OF THE INVENTION

The object of the invention is attained by providing a multilayer structure produced through co-extrusion of a multilayer melt that comprises a layer of an ethylene-vinyl alcohol copolymer resin composition containing from 100 to 5000 ppm, in terms of boric acid ($H_3BO_3$), of a boron compound, from 100 to 1000 ppm, in terms of the free acid, of a carboxylic acid and/or its salt, and from 50 to 300 ppm, in terms of the metal, of an alkali metal salt, and having an ethylene content of from 25 to 45 mol % and a degree of saponification of at least 99%, and a layer of a carboxylic acid-modified polyolefin resin adjacent thereto.

The object of the invention is also attained by providing a multilayer structure produced through co-extrusion of a multilayer melt that comprises a layer of an ethylene-vinyl alcohol copolymer resin composition containing from 10 to 50 ppm, in terms of the metal, of a salt of a metal of Group 2 of the Periodic Table, and having an ethylene content of from 25 to 45 mol % and a degree of saponification of at least 99%, and a layer of a carboxylic acid-modified polyolef in resin adjacent thereto. In this, preferably, the ethylene-vinyl alcohol copolymer resin composition contains from 100 to 5000 ppm, in terms of boric acid ($H_3BO_3$), of a boron compound, or contains from 100 to 1000 ppm, in terms of the free acid, of a carboxylic acid and/or its salt, or contains from 50 to 300 ppm, in terms of the metal, of an alkali metal salt.

In the multilayer structures, preferably, the carboxylic acid and/or its salt in the ethylene-vinyl alcohol copolymer resin composition is acetic acid and/or its salt. Preferably, the resin composition contains from 10 to 200 ppm, in terms of phosphoric acid ($H_3PO_4$), of a phosphoric acid derivative.

Preferably, the ethylene-vinyl alcohol copolymer resin composition has a melt index (at 190° C. under a load of 2160 g) falling between 3 and 15 g/10 min; and its decomposition point (JISK 7120) falls between 350 and 400° C.

Preferably, the ethylene-vinyl alcohol copolymer resin composition layer has a thickness of from 2 to 30 μm; the carboxylic acid-modified polyolef in resin has a density of from 0.88 to 0.94 g/cm$^3$, and a melt index (at 190° C. under a load of 2160 g) falling between 3 and 15 g/10 min; the multilayer melt is coated over a substrate, more preferably over a paper substrate through co-extrusion; and the oxygen transmission rate through the multilayer structure at 20° C. and 65% RH falls between 1 and 10 cc/m$^2$·day·atm.

The object of the invention is also attained by providing a process for producing the multilayer structures mentioned above, in which the take-up speed for co-extrusion is at least 100 m/min, or the die temperature for co-extrusion is at least 240° C.

The object of the invention is also attained by providing an ethylene-vinyl alcohol copolymer resin composition containing from 100 to 5000 ppm, in terms of boric acid ($H_3BO_3$), of a boron compound, from 100 to 1000 ppm, in terms of the free acid, of a carboxylic acid and/or its salt, and from 50 to 300 ppm, in terms of the metal, of an alkali metal salt, and having an ethylene content of from 25 to 45 mol % and a degree of saponification of at least 99%.

The object of the invention is also attained by providing an ethylene-vinyl alcohol copolymer resin composition containing from 100 to 5000 ppm, in terms of boric acid ($H_3BO_3$), of a boron compound, and from 10 to 50 ppm, in terms of the metal, of a salt of a metal of Group 2 of the Periodic Table, and having an ethylene content of from 25 to 45 mol % and a degree of saponification of at least 99%. Preferably, the resin composition contains from 100 to 1000 ppm, in terms of the free acid, of a carboxylic acid and/or its salt, or contains from 50 to 300 ppm, in terms of the metal, of an alkali metal salt.

Preferably, in the resin composition, the carboxylic acid and/or its salt is acetic acid and/or its salt, and the resin composition contains from 10 to 200 ppm, in terms of phosphoric acid ($H_3PO_4$), of a phosphoric acid derivative.

Preferably, the melt index (at 190° C. and under a load of 2160 g) of the resin composition falls between 3 and 15 g/10 min; the decomposition point (JISK 7120) thereof falls between 350 and 400° C.; and the water content thereof falls between 0.02 and 0.15% by weight.

Preferably, the resin composition is for co-extrusion, especially for co-extrusion coating.

The object of the invention is also attained by providing a multilayer structure having at least one layer of the resin composition mentioned above. Preferably, the multilayer structure has at least one carboxylic acid-modified polyolef in resin layer adjacent to the resin composition layer. Preferably, the thickness of the resin composition layer falls between 2 and 30 μm.

EVOH for use in the invention is obtained by saponifying a copolymer of ethylene and a vinyl ester of a fatty acid, and its has an ethylene content falling between 25 and 45 mol % and has a degree of saponification of at least 99%.

The ethylene content of EVOH is at least 25 mol %, but preferably at least 30 mol %, most preferably at least 33 mol %. If its ethylene content is smaller than 25 mol %, the thermal stability of EVOH during melt extrusion will be poor, and EVOH will easily gel. If so, EVOH moldings will have streaks and fish eyes. The problems are especially remarkable in higher temperature or higher speed long-run operation than under ordinary conditions. The ethylene content of EVOH is at most 45 mol %, but preferably at most 40 mol %, most preferably at most 37 mol %. If its ethylene content is larger than 45 mole %, the gas barrier properties of EVOH will be poor, and EVOH could not keep the characteristics intrinsic thereto. In particular, the thickness of the EVOH layer generally falling between 2 and 30 μm in many multilayer structures of the invention is smaller than that in ordinary moldings, and the gas barrier properties of the EVOH layer, if not good, will have great influences on the multilayer structures. In addition, if the ethylene content of EVOH is too high, the adhesiveness thereof to carboxylic acid-modified polyolefin resin layers will be poor.

Preferably, EVOH has a degree of saponification of at least 99%, more preferably at least 99.5%. If its degree of saponification is smaller than 99%, the gas barrier properties of EVOH will be poor and the melt stability thereof will be also poor. The matter is important to the multilayer structures of the invention in higher temperature or higher speed long-run operation than under ordinary conditions, as so mentioned hereinabove.

The melt index (at 190° C. and under a load of 2160 g) of the EVOH resin composition of the invention is not specifically defined, generally falling between 0.1 and 50 g/10 min, but preferably between 1 and 15 g/10 min. If its melt index is over 15 g/10 min, the mechanical strength of the moldings will be low and could not be on the practicable level. If so, in addition, the melt viscosity of the composition will be too low when the composition is molded in melt at high temperatures, and the resulting moldings will neck in. In that condition, the composition will be difficult to stably mold. More preferably, the melt index of the composition is at most 12 g/10 min, most preferably at most 10 g/10 min. On the other hand, when its melt index is smaller than 3 g/10 min and when the composition is molded in melt into films at a high take-up speed, then the films will be often broken since the melt viscosity of the composition being molded will be too high. In that condition, the composition will be difficult to mold in melt. In addition, when its melt index is smaller than 3 g/10 min and when the composition is molded at high temperatures in long-run operation, then the resulting moldings will often have fish eyes and streaks. Moreover, the resin output at a predetermined level of energy applied will be low in that condition. From these viewpoints, the melt index of the EVOH resin composition of the invention is more preferably at least 4 g/10 min, most preferably at least 6 g/10 min.

For controlling the melt index of the EVOH resin composition, for example, employable is any of (1) a method of controlling the amount of the polymerization catalyst to be used, the polymerization temperature and others to thereby control the degree of polymerization of the polymer being produced, (2) a method of copolymerizing monomers with a crosslinkable comonomer such as vinyltrimethoxysilane or the like to give the polymer, (3) a method of adding a crosslinkable compound such as boric acid or the like to the polymer having been produced, (4) a method of blending EVOH having a high degree of polymerization and EVOH having a low degree of polymerization to thereby control the degree of polymerization of the resulting polymer blend, etc. If desired, these methods may be combined. According to the method as above, obtained is an EVOH resin composition having a desired melt index.

If desired, any other comonomers [for example, propylene, butylene, unsaturated carboxylic acids or their esters (e.g., (meth)acrylic acid, (meth)acrylates, etc.), vinylpyrrolidones (e.g., N-vinylpyrrolidone, etc.)] may be copolymerized with the polymer within the range not interfering with the object of the invention. Also if desired, any of plasticizers, thermal stabilizers, UV absorbents, antioxidants, colorants, fillers, thickeners and other resins (e.g., polyamides, partially saponified ethylene-vinyl acetate copolymers, etc.) may be added to the resin composition within the range not interfering with the object of the invention.

The method of producing EVOH for use in the invention is described in detail hereinunder. To produce it, ethylene is polymerized with a vinyl ester in any desired manner of solution polymerization, suspension polymerization, emulsion polymerization or bulk polymerization and in any desired mode of continuous or batchwise polymerization. One example of batchwise solution polymerization to produce the polymer is described, for which the polymerization condition is as follows.

Solvent:
 Alcohols are preferred, but any other organic solvents (e.g., dimethylsulfoxide, etc.) capable of dissolving ethylene, vinyl esters and ethylene-vinyl ester copolymers may also be used. Alcohols usable herein include methyl alcohol, ethyl alcohol, propyl alcohol, n-butyl alcohol, t-butyl alcohol, etc. Especially preferred is methyl alcohol.
Catalyst:
 Usable are azonitrile-type initiators such as 2,2'-azobisisobutyronitrile, 2,2'-azobis-(2,4-dimethylvaleronitrile), 2,2'-azobis-(4-methyl-2,4-dimethylvaleronitrile), 2,2'-azobis-(4-methoxy-2,4-dimethylvaleronitrile), 2,2'-azobis-(2-cyclopropylpropionitrile), etc.; organic peroxide-type initiators such as isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide, t-butyl hydroperoxide, etc.
Temperature:
 20 to 90° C., preferably 40 to 70° C.
Time:
 2 to 15 hours, preferably 3 to 11 hours.
Degree of Polymerization:
 10 to 90%, preferably 30 to 80% based on the vinyl ester fed into the reactor.
Resin Content of the Solution after Polymerization:
 5 to 85%, preferably 20 to 70%.

Except for ethylene and vinyl esters, any other monomers capable of copolymerizing with them, for example, propylene, butylene, unsaturated carboxylic acids or their esters [such as (meth)acrylic acid, (meth)acrylates (e.g., methyl or ethyl esters), etc.)], vinylpyrrolidones (e.g., N-vinylpyrrolidone, etc.) may be used as the comonomers.

After the monomers have been polymerized for a predetermined period of time to give the intended copolymer having a predetermined degree of polymerization, a polymerization inhibitor may be added thereto, if desired. Then, the non-reacted ethylene gas is evaporated away, and the non-reacted vinyl ester is purged away. To purge the ethylene-vinyl ester copolymer from the non-reacted vinyl ester after the removal of ethylene from the copolymer through evaporation, for example, the copolymer solution is continuously run into a column filled with raschig rings, in the downward direction at a constant flow rate, while a vapor of an organic solvent such as methanol or the like is jetted into the column from its bottom, whereby a mixed vapor of the organic solvent such as methanol or the like and the non-reacted vinyl ester is run off from the column through its top, and the copolymer solution from which the non-reacted vinyl ester was removed is taken out of the column through its bottom.

An alkali catalyst is added to the copolymer solution from which the non-reacted vinyl ester was removed, and it saponifies the vinyl ester moiety of the copolymer. For this, employable is any of continuous or batchwise saponification. The alkali catalyst includes, for example, sodium hydroxide, potassium hydroxide, alkali metal alcoholates, etc. One example of batchwise saponification is described, for which the condition is as follows.

Concentration of Copolymer Solution:
 10 to 50%.
Reaction Temperature:
 30 to 60° C.
Amount of Catalyst to be Used:
 0.02 to 0.6 equivalents (based on the vinyl ester).
Time:
 1 to 6 hours.

After having been thus processed, EVOH is optionally neutralized and then washed to remove the alkali catalyst, by-produced salts and other impurities therefrom.

If desired, various compounds may be added to EVOH. In order to more favorably ensure the effect of the invention, it is desirable to dip EVOH in a solution of the compound mentioned above. This may be effected either in a batchwise process or a continuous process. For its morphology, the saponified product may be in any form of powders, granules, spherical pellets, columnar chips, etc.

Desirably, the EVOH resin composition of the invention contains from 100 to 5000 ppm, in terms of boric acid ($H_3BO_3$), of a boron compound, as its thermal stability, especially its long-run workability at high temperatures can be improved.

For the boron compound to be used in the invention, preferred are boric acid and its derivatives such as esters and salts of boric acid, etc. The boric acid includes orthoboric acid, metaboric acid, tetraboric acid, etc.; and its salts include sodium metaborate, sodium tetraborate, sodium pentaborate, borax, lithium borate, potassium borate, etc. Esters of boric acid include triethyl borate, trimethyl borate, etc. Of those, preferred are orthoboric acid (this is hereinafter referred to as boric acid), borax and their derivatives, as being effective and inexpensive.

Preferably, the boron compound content of the resin composition falls between 100 and 5000 ppm in terms of boric acid ($H_3BO_3$). More preferably, it is at least 500 ppm, most preferably at least 1000 ppm. Having the boron compound content that falls within the defined range, EVOH could have good melt extrudability as its torque fluctuation in melt under heat could be retarded. More preferably, the boron compound content is at most 3000 ppm, most preferably at most 2000 ppm. If it is over 5000 ppm, boric acid will locally increase in the resin composition and the composition will be readily gelled. If so, the melt-molded products of the composition will have many fish eyes and gels, and molding the composition will end in failure. On the other hand, if the boron compound content is smaller than 100 ppm, the intended effect of the invention will be difficult to achieve.

Preferably, the EVOH resin composition of the invention contains from 100 to 1000 ppm, in terms of the free acid, of a carboxylic acid and/or its salt. Containing it, the melt-molded products of the composition could be prevented from being discolored.

The carboxylic acid is not specifically defined, including, for example, acetic acid, propionic acid, etc. Most preferred is acetic acid. Carboxylic acids having a plurality of carboxyl groups in the molecule (poly-basic acids), such as adipic acid, phthalic acid and others, are unfavorable to the invention, since they will crosslink EVOH molecules to worsen the thermal stability of the resin composition. Therefore, using mono-basic carboxylic acids is preferred in the invention.

The preferred range of the content of the carboxylic acid and/or its salt in the composition falls between 100 and 1000 ppm in terms of the free acid. More preferably, the content is at least 150 ppm, most preferably at least 200 ppm. If its content is smaller than 100 ppm, the carboxylic acid and/or its salt added will be ineffective for preventing the discoloration of the moldings, and the moldings will be yellowed. More preferably, the content is at most 500 ppm, most preferably at most 400 ppm. If its content is over 1000 ppm, the carboxylic acid and/or its salt added will form gels in the melt-molded products, especially in long-run melt-molding operation. Too much of it will cause fish eyes and gels, and the moldings of the composition will have poor appearances.

Preferably, the EVOH resin composition of the invention contains at least 50 ppm, in terms of the metal, of an alkali metal salt. Containing it, the composition could enjoy good adhesiveness to the adhesive to be co-extruded with it, and the co-extruded moldings could have good interlayer adhesiveness. In general, the alkali metal salt content falls between 50 and 500 ppm.

The alkali metal salt is not specifically defined, including, for example, sodium salts, potassium salts, etc. The metal salts may be carboxylates, phosphates, borates, etc., but preferred are lactates or acetates. Especially preferred are acetates.

Especially in high-temperature molding operation, the alkali metal content is preferably from 50 to 300 ppm in terms of the metal, more preferably at least 70 ppm, most preferably at least 90 ppm. If smaller than 50 ppm, it will cause adhesion failure in co-extrusion molding operation. More preferably, the alkali metal content is at most 250 ppm, most preferably at most 200 ppm. If over 300 ppm, it will decompose in high-temperature molding operation, and the moldings will be discolored and will have poor appearances.

For long-run, stable melt molding thereof, the EVOH resin composition of the invention preferably contains a salt of a metal of Group 2 of the Periodic Table. Its content is not specifically defined, but generally falls between 10 and 200 ppm in terms of the metal. The salt of a metal of Group 2 of the Periodic Table is not specifically defined, including magnesium salts, calcium salts, barium salts, etc. The metal salts could be of carboxylates, phosphates, borates, etc.; but especially preferred are acetates.

Especially for ensuring long-run, stable melt molding thereof at high temperatures, it is desirable that the composition contains from 10 to 50 ppm, in terms of the metal, of such a salt of a metal of Group 2 of the Periodic Table. Containing it, the composition could be molded in melt for a long period of time even in high-temperature long-run molding lines without undergoing significant viscosity change, and could give moldings with good appearances.

More preferably, the content of the salt of a metal of Group 2 of the Periodic Table in the composition is at least 15 ppm, most preferably at least 20 ppm. If smaller than 10 ppm, the films of the composition formed in high-temperature long-run melt molding operation will have increased fish eyes on their surfaces. More preferably, the content is at most 45 ppm, most preferably at most 40 ppm. If over 50 ppm, the composition will foam in the extruder die through which it is melt-molded at high temperatures (around 280° C.), whereby its moldings will have voids and pin holes.

Preferably, the EVOH resin composition of the invention contains from 10 to 200 ppm, in terms of phosphoric acid ($H_3PO_4$), of a phosphoric acid derivative. Containing it, the composition will discolor little while molded in melt, and will hardly gel. The phosphoric acid derivative is not specifically defined, including phosphoric acid and its salts, etc. Salts of phosphoric acid that may be in the composition could be any of primary phosphates, secondary phosphates and tertiary phosphates, of which the cations are not also specifically defined. Preferably, however, the salts are alkali metal salts and salts of a metal of Group 2 of the Periodic Table such as those mentioned above.

Concretely, the phosphoric acid derivative includes sodium dihydrogenphosphate, potassium dihydrogenphosphate, disodium hydrogenphosphate, dipotassium hydrogenphosphate; and especially preferred is potassium dihydrogenphosphate.

More preferably, the phosphoric acid derivative content of the composition falls between 10 and 100 ppm in terms of phosphoric acid ($H_3PO_4$), most preferably at least 20 ppm. If smaller than 10 ppm, it will be ineffective for preventing the discoloration of the composition being molded in melt, and the moldings will be discolored and will have poor appearances. Even more preferably, the derivative content is at most 80 ppm, most preferably at most 60 ppm. If over 100 ppm, the composition will be readily gelled while molded in melt especially at high temperatures, and its moldings will have many fish eyes and gels and will have poor appearances.

Specifically, one preferred embodiment of the EVOH resin composition of the invention contains from 100 to 5000 ppm, in terms of boric acid ($H_3BO_3$), of a boron compound, from 100 to 1000 ppm, in terms of the free acid, of a carboxylic acid and/or its salt, and from 50 to 300 ppm, in terms of the metal, of an alkali metal salt, as surely realizing the effect of the invention.

Another embodiment of the composition containing from 10 to 50 ppm, in terms of the metal, of a salt of a metal of Group 2 of the Periodic Table is also preferred. Still another embodiment thereof further containing from 100 to 5000 ppm, in terms of boric acid ($H_3BO_3$), of a boron compound, in addition to the salt of a metal of Group 2 of the Periodic Table, is more preferred.

The method of adding the compounds mentioned above to EVOH is not specifically defined. For this, for example, employable is any of a method of dipping EVOH in a solution of any of the compounds; a method of melting EVOH followed by mixing the melt with any of the compounds; a method of dissolving EVOH in a proper solvent followed by mixing the solution with any of the compounds, etc.

In the method of dipping EVOH in a solution of any of the compounds, the concentration of the compound in the solution is not specifically defined. The solvent for the solution is not also specifically defined, but preferred is an aqueous solution as being easy to handle. It is desirable that the weight of the solution in which the saponified product is dipped is at least 3 times, more preferably at least 20 times the weight of the saponified product in dry. The preferred range of the dipping time varies, depending on the form of EVOH. For example, EVOH chips may be dipped in the solution for at least 1 hour, but preferably at least 2 hours.

Preferably, the decomposition point (JISK 7120) of the EVOH resin composition of the invention falls between 350 and 400° C. Having the decomposition point falling within the defined range, the composition could be well molded even in high-temperature long-run lines with no resin degradation that may cause molding failure. More preferably, the decomposition point of the composition is not lower than 355° C., most preferably not lower than 360° C.

EVOH for use in the invention is not limited to only single EVOH, but may be a blend of plural EVOHs that differ in the degree of polymerization, the ethylene content or the degree of saponification.

If desired, any other different types of thermoplastic resins may be added to the EVOH resin composition of the invention within the range not interfering with the effect of the invention. The thermoplastic resins to that effect include various types of polyolefins (polyethylene, polypropylene, poly-1-butene, poly-4-methyl-1-pentene, ethylene-propylene copolymers, copolymers of ethylene with α-olefins having at least 4 carbon atoms, polyolefin-maleic anhydride copolymers, ethylene-vinyl ester copolymers, ethylene-acrylate copolymers, graft-modified polyolefins with unsaturated carboxylic acids or their derivatives, etc.); various types of nylons (nylon 6, nylon 66, nylon 6/66 copolymers, etc.); polyvinyl chloride, polyvinylidene chloride, polyesters, polystyrenes, polyacrylonitriles, polyurethanes, polyacetals, modified polyvinyl alcohol resins, etc.

Also if desired, the EVOH resin composition of the invention may contain not too much of various plasticizers, stabilizers, surfactants, colorants, UV absorbents, antistatic agents, drying agents, crosslinking agents, metal salts, fillers, reinforcing agents such as various types of fibers, etc.

The method of molding the EVOH resin composition of the invention is not specifically defined, for which, however, preferred is co-extrusion of a multilayer melt that comprises a layer of the EVOH resin composition. More preferred is co-extrusion of a multilayer melt that comprises a layer of the EVOH resin composition and a layer of a carboxylic acid-modified polyolefin resin adjacent thereto.

In general, EVOH resins are more expensive than other ordinary resins such as polyolefin resins, etc. In co-extrusion of the EVOH resin composition of the invention, the resin layer could be thinned. Through such co-extrusion, multilayer structures having a layer of an adhesive resin (in many cases, this is a carboxylic acid-modified polyolefin resin) that ensures the adhesiveness of the EVOH resin layer to the other layers and having a hydrophobic resin layer that protects the EVOH resin composition from absorbing moisture could be finished in one molding operation. Still another advantage of the co-extrusion with such a polyolefin resin with good extrusion moldability is that, in most cases, more stable molding of the EVOH resin composition is possible in the co-extrusion than in single extrusion of the composition to give a single EVOH layer.

The carboxylic acid-modified polyolefin to be co-extruded along with the EVOH resin composition is a polyolefin having a carboxyl group (or a carboxyl anhydride group) in the molecule, including, for example, graft-modified polyolefins with any of α,β-unsaturated carboxylic acids or their anhydrides, as well as random copolymers of olefin monomers with any of α,β-unsaturated carboxylic acids or their anhydrides.

The α,β-unsaturated carboxylic acids or their anhydrides include acrylic acid, methacrylic acid, maleic acid, itaconic acid, maleic anhydride, itaconic anhydride, etc.; and preferred is maleic anhydride.

Preferably, the carboxylic acid-modified polyolefin is a carboxylic acid-modified polyethylene having a density of from 0.88 to 0.94 $g/cm^3$, more preferably from 0.90 to 0.93 $g/cm^3$, even more preferably from 0.905 to 0.92 $g/cm^3$. Typically, the carboxylic acid-modified polyethylene includes low-density polyethylene-based resins produced in a high-pressure process, and linear low-density polyethylene (LLDPE)-based resins produced in a low-pressure process in the presence of a Ziegler catalyst. Of these, preferred are LLDPE-based resins as being easy to mold. The carboxylic acid-modified polyethylene may be further modified with comonomers such as vinyl acetate, etc.

Carboxylic acid-modified polypropylene is also preferred.

The melt index (at 190° C. under a load of 2160 g) of the carboxylic acid-modified polyolefin is not specifically defined, generally falling between 0.1 and 50 g/10 min, but preferably between 1 and 15 g/10 min. Preferably, it is at most 12 g/10 min, more preferably at most 10 g/10 min. Also preferably, it is at least 3 g/10 min, more preferably at least 4 g/10 min, even more preferably at least 6 g/10 min. It is desirable that there is no difference in the melt index between the carboxylic acid-modified polyolefin and the EVOH resin composition to be co-extruded therewith, as the co-extruded moldings could have good appearances with little non-uniformity in the interlayer boundaries.

The EVOH resin composition of the invention is favorable to extrusion coating. Generally, extrusion coating is effected in high-speed molding lines for improved production efficiency. In high-speed molding lines, the resins are melted and molded at higher temperatures than in ordinary molding lines for preventing the molded films from necking in. To such lines, the EVOH resin composition of the invention having good thermal stability and good high-speed moldability is favorable. It is more favorable to co-extrusion coating.

The melt-molding temperature of the EVOH resin composition of the invention is not specifically defined, as it varies depending on the melting point of the copolymer, the molding method for the composition, etc. Preferably, however, the temperature is not lower than 220° C., more preferably not lower than 230° C. Especially in high-speed extrusion coating lines, the die temperature is preferably not lower than 240° C. for preventing the coated films from necking in, more preferably not lower than 250° C., even more preferably not lower than 260° C. The take-up speed in extrusion molding of the composition is not also specifically defined, but is preferably at least 100 m/min in extrusion coating thereof for improved production efficiency, more preferably at least 120 m/min, even more preferably at least 150 m/min.

Preferably, the water content of the EVOH resin composition to be co-extruded is controlled to fall between 0.02 and 0.15% by weight, more preferably at most 0.10% by weight. If its water content is larger than 0.15% by weight, the composition will foam while molded in melt at high temperatures, and the moldings will have voids and pin holes. More preferably, the water content of the composition is at least 0.05% by weight. If the composition is too much dried, thereby having a water content of smaller than 0.02% by weight, the drying temperature shall be too high or the drying time shall be too long. If so, the resin will be thermally degraded and yellowed.

For controlling the water content to fall within the defined range, employable is a method of drying EVOH chips at a temperature falling between 80 and 110° C. In the method, the drying time could be properly controlled, depending on the capacity of the drier used and the amount of the resin to be dried therein.

The layer constitution of the multilayer structures having a layer of the EVOH resin composition of the invention is not specifically defined, but is preferably such that the EVOH resin composition layer is adjacent to an adhesive resin layer to ensure the interlayer adhesiveness of the multilayer structures. Some examples of the layer constitution of the multilayer structures are mentioned below, in which AD indicates an adhesive resin layer and TR indicates a thermoplastic resin layer.

TR/AD/EVOH
TR/AD/EVOH/TR
TR/AD/EVOH/AD/TR

In these examples, the thermoplastic resin for TR is not specifically defined. In one multilayer structure, different types of thermoplastic resins may be used. One multilayer structure may have plural layers of TR.

The thermoplastic resin includes polyolefins, polyamides, polyesters, etc. Polyolefins are the most typical thermoplastic resins. Of those, polyethylene and polypropylene are suitable for use in the invention. In particular, in the invention, most important is polyethylene having a density of from 0.88 to 0.94 g/cm³, preferably from 0.90 to 0.93 g/cm³, more preferably from 0.905 to 0.92 g/cm³. Polyethylene of that type is useful, as having good moisture resistance, good heat-sealability and good flexibility and as being inexpensive. Typically, it includes low-density polyethylene produced in a high-pressure process, and linear low-density polyethylene (LLDPE) produced in a low-pressure process in the presence of a Ziegler catalyst. Of these, preferred is LLDPE as being easy to mold.

In the multilayer structures of the invention, the thickness of the EVOH resin composition layer is not specifically defined, but preferably falls between 2 and 30 µm when the structures are produced in high-temperature or high-speed molding lines. If the thickness of the layer is smaller than 2 µm, it will be difficult to prevent the moldings from having pin holes in high-speed molding lines. More preferably, the thickness of the layer is at least 3 µm. However, if it is larger than 30 µm, the costs of the molding material will increase and the moldings produced will have poor surface appearances. More preferably, the thickness of the layer is at most 15 µm, even more preferably at most 8 µm.

The resin composition of the invention is favorable to extrusion coating, especially to co-extrusion coating. The substrate to be coated with the composition through extrusion is not specifically defined, including, for example, paper, plastic films, metal foils, etc. In particular, for coating the EVOH resin composition of the invention through extrusion thereon, paper substrates are the most useful of all, as being not melt-moldable by themselves and as not having gas barrier properties by themselves. One or both surfaces of the paper substrates for use herein may be pre-coated with a resin such as low-density polyethylene (hereinafter referred to as LDPE) or the like.

The layer constitution of the multilayer structures to be produced by coating a substrate with a multilayer melt that comprises an EVOH resin layer and an adhesive layer adjacent thereto through co-extrusion of the layers on the substrate is not specifically defined. Some preferred examples of the layer constitution are mentioned below, in which AD indicates an adhesive resin layer, and TR indicates a thermoplastic resin layer.

Inner layer:AD/EVOH/AD/substrate:outer layer
Inner layer:TR/AD/EVOH/AD/TR/substrate/TR:outer layer
Inner layer:TR/AD/EVOH/AD/TR/TR/substrate/TR:outer layer
Inner layer:EVOH/AD/TR/substrate/TR:outer layer
Inner layer:TR/AD/EVOH/substrate/TR:outer layer
Inner layer:EVOH/AD/TR/AD/EVOH/AD/TR/substrate/TR:outer layer
Inner layer:TR/AD/EVOH/AD/substrate/TR:outer layer
Inner layer:AD/EVOH/AD/substrate/TR:outer layer The oxygen transmission rate through the multilayer structures of the invention at 65% RH is not specifically defined, but preferably falls between 1 and 10 cc/m²·day·atm at 20° C. and 65% RH. If over 10 cc/m²·day·atm, the long-term storability of the contents in the structures will be poor. More preferably, the oxygen transmission rate through the structures is at most 8 cc/m²·day·atm, most preferably at most 6 cc/m²·day·atm. However, if smaller than 1 cc/m²·day·atm, the thickness of the EVOH layer in the structures will be too thick, and it is undesirable as the costs of the molding material will increase. More preferably, the oxygen transmission rate through the structures is at least 1.2 cc/m²·day·atm, most preferably at least 1.5 cc/m²·day·atm.

The multilayer structures produced in the manner as herein are used as various containers, etc. Preferably, they are worked into cartons, cups and others, and are favorably used as various types of paper-based containers. Various beverages and others can be stored for a long period of time in such paper-based containers.

BEST MODES OF CARRYING OUT THE INVENTION

The invention is described more concretely with reference to the following Examples. In the following description, "%" and "parts" are all by weight unless otherwise specifically indicated. Water used herein is ion-exchanged water.
(1) Quantitative Determination of Acetate Ions and Phosphate Ions:

10 g of a sample of dry chips is put into 50 ml of an aqueous solution of 0.01 N hydrochloric acid, and stirred at 95° C. for 6 hours. After thus stirred, the aqueous solution is subjected to quantitative analysis through ion chromatography, and the amount of acetate ions and phosphate ions therein are quantitatively determined. The column used is Yokogawa Electric's ICS-A23, and the eluent used is an aqueous solution containing 2.5 mM sodium carbonate and 1.0 mM sodium hydrogencarbonate. For the quantitative determination, used are calibration curves of aqueous solutions of acetic acid and phosphoric acid. From the data of acetate ions and phosphate ions thus obtained, the content of the acid and/or its salt in the sample is derived in terms of the weight of the acid.

(2) Quantitative Determination of Na, K and Ca Ions:

10 g of a sample of dry chips is put into 50 ml of an aqueous solution of 0.01 N hydrochloric acid, and stirred at 95° C. for 6 hours. After thus stirred, the aqueous solution is subjected to quantitative analysis through ion chromatography, and the amount of Na ions, K ions and Ca ions therein is quantitatively determined. The column used is Yokogawa Electric's ICS-C25, and the eluent used is an aqueous solution containing 5.0 mM tartaric acid and 1.0 mM 2,6-pyridinedicarboxylic acid. For the quantitative determination, used are calibration curves of aqueous solutions of sodium chloride, potassium chloride and calcium chloride. From the data of Na ions, K ions and Ca ions thus obtained, the content of the alkali metal salt and the metal salt of Group 2 of the Periodic Table in the sample of dry chips is derived in terms of the weight of the metal.

(3) Quantitative Determination of Boron Compound:

100 g of a sample of dry chips is put into a ceramic crucible, and ashed in an electric furnace. The resulting ash is dissolved in 200 ml of an aqueous solution of 0.01 N nitric acid, and subjected to atomic absorption analysis to thereby determine the boron element content of the ash. From the data thus obtained, the boron compound content of the sample is derived in terms of the weight of boric acid ($H_3BO_3$)

(4) Water Content of EVOH Resin Composition:

20 g of a sample of chips is put into a laboratory bottle, and heated in a hot air drier at 120° C. for 24 hours. From the weight of the thus-dried chips, obtained is the water content of the sample according to the following equation:

$$\text{Water content (wt. \%)} = \{(\text{weight of original sample} - \text{weight of dried sample})/\text{weight of original sample}\} \times 100$$

(5) Decomposition Point:

A sample is dried in vacuum to have a controlled volatile content of not larger than 0.1% by weight, and its decomposition point is measured in a device for TG-DTA measurement (Seiko Electronics' TG-DTA220) according to the condition indicated in JIS K7120. In the device, the heating rate of the sample is 10° C./min.

(6) Oxygen Transmission Rate:

Pieces are cut out of the multilayer structure produced, and conditioned at 20° C. and 65% RH. Using an oxygen transmission rate measuring device (Modern Control's OX-TRAN-10/50A), the oxygen transmission rate (ml/$m^2 \cdot \text{day} \cdot \text{atm}$) through each piece is measured.

(7) Melt Index (MI):

Using a melt indexer according to ASTM-D1238, the melt index of a sample was measured at a temperature of 190° C. and under a load of 2160 g. For samples of EVOH having a melting point higher than about 190° C., the melt index of each sample is measured at some different temperatures not lower than 190° C. but under the same load of 2160 g. From the data obtained, the melt index at 190° C. of the sample is extrapolated.

(8) Evaluation of Co-Extrusion Coatability:

A two-resin three-layered film is formed on a paper substrate by coating the substrate with an EVOH resin composition and a carboxylic acid-modified polyolefin resin through co-extrusion of the two resins onto the substrate.

The substrate is Kishu Papermaking's "Kinsa" (unit weight: 80 g/$m^2$, thickness: 100 μm, width: 600 mm).

The apparatus used for extrusion coating is as follows:

Extruder for EVOH Resin Composition:

Single-screw extruder having L/D=26, and a die orifice of 50 mmφ.

Extruder for Carboxylic Acid-Modified Polyolefin:

Single-screw extruder having L/D=31, and a die orifice of 65 mmφ.

Profile of Die:

The width is 620 mm; the lip-to-lip distance is 0.7 mm; and the air gap is 110 mm.

The co-extruded coating layer constitution formed is adhesive layer/EVOH/adhesive layer of 25/5/25 μm in thickness. To form it, used are the EVOH extruder and the adhesive resin extruder as above, a feed block via which the resins having been extruded out of the extruders are combined and partitioned, and the T-die as above. The adhesive layer is of a maleic anhydride-modified, linear low-density polyethylene (Mitsui Chemical's Admer AT1188). Regarding the co-extrusion coating temperature condition, both the feed block and the die are at 280° C., and the take-up speed is 150 m/min.

The two resins are co-extruded onto the substrate under the condition as above, and the coated substrate is evaluated as follows:

<1> Evaluation of Necking-in Resistance:

Just after the start of the co-extrusion coating operation, the multilayer structure is sampled to have a length of 10 meters. On the sample, the width of the co-extruded, coated resin layer is measured at intervals of 1 meter. The value obtained by subtracting the width of the layer thus measured from the width of the die indicates the necked-in width.

The criteria for evaluation of the necking-in resistance of the co-extruded resins are as follows:

A: The necked-in width is smaller than 50 mm.

B: The necked-in width is from 50 to 100 mm.

C: The necked-in width is from 100 to 200 mm.

D: The necked-in width is over 200 mm.

<2> Evaluation of Film Appearances:

Just after the start of the co-extrusion coating operation, after 30 minutes and after 3 hours, the multilayer structure is sampled. The samples are macroscopically checked for fish eyes, streaks and discoloration.

Concretely, the number of easily detectable fish eyes is counted in the area of 10 cm×10 cm of each sample. For the streaks and discoloration, each sample is checked according to the criteria mentioned below.

Criteria for Fish Eye Resistance:

A: The number of fish eyes is smaller than 5 per 100 $cm^2$.

B: The number of fish eyes is from 5 to 20 per 100 $cm^2$.

C: The number of fish eyes is from 20 to 50 per 100 $cm^2$.

D: The number of fish eyes is over 50 per 100 $cm^2$.

Criteria for Streak Resistance:
  A: No streak found.
  B: Some but slight streaks found.
  C: Some visible streaks found.
  D: Many streaks found.
Criteria for Discoloration Resistance:
  A: Colorless.
  B: Slightly yellowed.
  C: Visibly yellowed.
  D: Greatly yellowed.
(9) Interlayer Adhesiveness Between EVOH/Carboxylic Acid-Modified Polyolefin Layers:

Just after the start of the co-extrusion coating operation, the multilayer structure, paper/carboxylic acid-modified polyolefin/EVOH/carboxylic acid-modified polyolefin produced is subjected to T-type tensile strength autography (stress rate: 350 mm/min) to measure the interlayer adhesiveness between the layers of EVOH/AD adjacent to the paper substrate. From the data of the peeling strength thus obtained, the interlayer adhesiveness of the sample is evaluated according to the criteria mentioned below.

Criteria for Interlayer Adhesiveness:
  A: Over 600 g/cm.
  B: From 400 to 600 g/cm (good in practical use).
  C: From 200 to 400 g/cm (insufficient in practical use).
  D: Smaller than 200 g/cm (not good in practical use).

EXAMPLE 1

86300 parts of vinyl acetate, 34400 parts of methanol and 8.6 parts of AIBN (azobisisobutyronitrile) were fed into a polymerization reactor having a pressure resistance of up to 100 kg/cm$^2$, and purged with nitrogen with stirring. While heating it, ethylene was introduced thereinto until the inner temperature reached 60° C. and the ethylene pressure reached 39.5 kg/cm$^2$. The controlled temperature and pressure were kept as such for 9.2 hours, and the monomers were copolymerized under the controlled condition. Next, 7 parts of hydroquinone was added to the system, the polymerization reactor was left at normal pressure, and ethylene was evaporated away. Next, the methanol solution was continuously run into a purging column filled with raschig rings, in the downward direction from its top, while a vapor of methanol was jetted into the column through its bottom, whereby the non-reacted vinyl acetate monomer was purged away along with the methanol vapor from the column through its top and removed via the condenser connected with the column. As a result, obtained was a methanol solution of 45% ethylene-vinyl acetate copolymer having a non-reacted vinyl acetate content of not larger than 0.01%. The degree of polymerization of the copolymer was 30% based on the vinyl acetate fed into the reactor; and the ethylene content thereof was 35 mol %.

Next, the methanol solution of ethylene-vinyl acetate copolymer was fed into a saponification reactor, to which was added sodium hydroxide/methanol solution (80 g/liter) in an amount of 0.4 equivalents based on the vinyl acetate moiety of the copolymer. To this was added methanol so that the copolymer concentration in the solution was controlled to be 20%. This was heated at 60° C. and reacted for about 4 hours while nitrogen gas was introduced into the reactor. Next, this was neutralized with acetic acid and the reaction was stopped. The resulting product was extruded out into water through the circular opening of a metal plate, and deposited therein. The resulting deposit was cut into chips having a diameter of about 3 mm and a length of about 5 mm. The chips were dewatered in a centrifugal separator, then washed with a large amount of water added thereto, and again dewatered. In that manner, the chips were repeatedly washed with water. The saponified ethylene-vinyl acetate copolymer had a degree of saponification of 99.7 mol %.

10 kg of the chips were dispersed in 150 liters of water containing 0.4 g/liter of acetic acid, 0.05 g/liter of potassium dihydrogenphosphate, 0.1 g/liter of calcium acetate and 0.1 g/liter of sodium acetate, and stirred for 4 hours. Next, the resulting pellets were taken out, dewatered through centrifugation, and dried with hot air at 80° C. for 6 hours and then at 105° C. for 24 hours.

MI of the dry pellets was 8 g/10 min; the calcium salt content thereof was 30 ppm in terms of calcium; the acetic acid and its salt content thereof was 600 ppm in terms of acetic acid; the alkali metal salt content thereof was 150 ppm in terms of the metal; and the phosphoric acid derivative content thereof was 35 ppm in terms of phosphoric acid. The water content of the dry pellets was 0.08% by weight; and the decomposition point thereof was 380° C.

Using the EVOH resin composition pellets thus obtained herein, a two-resin, three-layered coating film was formed on a paper substrate through co-extrusion of two resins. The data of the coating film are given in Table 2.

EXAMPLES 2 to 14

Comparative Examples 1 to 10

In place of the EVOH resin composition pellets used in Example 1, different EVOH resin composition pellets shown in Table 1 were used. With these pellets, coating films were formed on paper substrates through co-extrusion of two resins in the same manner as in Example 1, and evaluated. The aqueous dispersion of resin pellets used herein were prepared by appropriately controlling the content of acetic acid, potassium dihydrogenphosphate, calcium acetate, sodium acetate and boric acid therein. The data of the coating films formed herein are given in Table 2.

TABLE 1

|  | Ethylene Content mol % | Degree of Saponification mol % | MI g/10 min | Salt of Group 2 Metal ppm | Alkali Metal Salt ppm | Boric Acid Derivative ppm | Phosphoric Acid Derivative ppm | Acetic Acid/Acetate ppm | Decomposition Point ° C. | Water Content wt. % |
|---|---|---|---|---|---|---|---|---|---|---|
| Ex. 1 | 35 | 99.7 | 8 | 30 | 150 | 0 | 35 | 600 | 380 | 0.08 |
| Ex. 2 | 35 | 99.7 | 8 | 30 | 350 | 0 | 35 | 600 | 380 | 0.08 |
| Ex. 3 | 35 | 99.7 | 8 | 30 | 20 | 0 | 35 | 600 | 380 | 0.08 |
| Ex. 4 | 35 | 99.7 | 8 | 30 | 150 | 0 | 35 | 1300 | 380 | 0.08 |
| Ex. 5 | 35 | 99.7 | 8 | 30 | 150 | 0 | 35 | 80 | 380 | 0.08 |
| Ex. 6 | 35 | 99.7 | 8 | 30 | 150 | 0 | 0 | 600 | 380 | 0.08 |
| Ex. 7 | 35 | 99.7 | 20 | 30 | 150 | 0 | 35 | 600 | 380 | 0.08 |

TABLE 1-continued

|  | Ethylene Content mol % | Degree of Saponification mol % | MI g/10 min | Salt of Group 2 Metal ppm | Alkali Metal Salt ppm | Boric Acid Derivative ppm | Phosphoric Acid Derivative ppm | Acetic Acid/Acetate ppm | Decomposition Point ° C. | Water Content wt. % |
|---|---|---|---|---|---|---|---|---|---|---|
| Ex. 8 | 35 | 99.7 | 8 | 30 | 150 | 1500 | 35 | 600 | 380 | 0.08 |
| Ex. 9 | 35 | 99.7 | 8 | 30 | 350 | 1500 | 35 | 600 | 380 | 0.08 |
| Ex. 10 | 35 | 99.7 | 8 | 30 | 20 | 1500 | 35 | 600 | 380 | 0.08 |
| Ex. 11 | 35 | 99.7 | 8 | 30 | 150 | 1500 | 35 | 1300 | 380 | 0.08 |
| Ex. 12 | 35 | 99.7 | 8 | 30 | 150 | 1500 | 35 | 80 | 380 | 0.08 |
| Ex. 13 | 35 | 99.7 | 8 | 30 | 150 | 1500 | 0 | 600 | 380 | 0.08 |
| Ex. 14 | 35 | 99.7 | 8 | 0 | 150 | 1500 | 35 | 600 | 380 | 0.08 |
| Co. Ex. 1 | 48 | 99.7 | 8 | 30 | 150 | 0 | 35 | 600 | 390 | 0.08 |
| Co. Ex. 2 | 35 | 97.5 | 8 | 30 | 150 | 0 | 35 | 600 | 340 | 0.08 |
| Co. Ex. 3 | 35 | 99.7 | 8 | 0 | 150 | 0 | 35 | 600 | 380 | 0.08 |
| Co. Ex. 4 | 35 | 99.7 | 8 | 60 | 150 | 0 | 35 | 600 | 330 | 0.08 |
| Co. Ex. 5 | 48 | 99.7 | 8 | 30 | 150 | 1500 | 35 | 600 | 390 | 0.08 |
| Co. Ex. 6 | 35 | 97.5 | 8 | 30 | 150 | 1500 | 35 | 600 | 340 | 0.08 |
| Co. Ex. 7 | 35 | 99.7 | 8 | 0 | 350 | 1500 | 35 | 600 | 380 | 0.08 |
| Co. Ex. 8 | 35 | 99.7 | 8 | 0 | 20 | 1500 | 35 | 600 | 380 | 0.08 |
| Co. Ex. 9 | 35 | 99.7 | 8 | 0 | 150 | 1500 | 35 | 1300 | 380 | 0.08 |
| Co. Ex. 10 | 35 | 99.7 | 8 | 0 | 150 | 1500 | 35 | 80 | 380 | 0.08 |

TABLE 2

|  |  |  |  | Co-extrusion Coating Test*2 | | | | | | | | |
|---|---|---|---|---|---|---|---|---|---|---|---|---|
|  |  |  | Interlayer | Fish Eyes | | | Streaks | | | Discoloration | | |
|  | OTR*1 | Necking | Adhesiveness | Fresh Samples | After 30 minutes | After 3 hours | Fresh Samples | After 30 minutes | After 3 hours | Fresh Samples | After 30 minutes | After 3 hours |
| Ex. 1 | 2.2 | A | A | A | A | B | A | A | B | A | A | A |
| Ex. 2 | 2.2 | A | A | A | A | B | A | A | B | B | B | B |
| Ex. 3 | 2.2 | A | D | A | A | B | A | A | B | A | A | A |
| Ex. 4 | 2.2 | A | A | A | B | C | A | B | C | A | A | A |
| Ex. 5 | 2.2 | A | A | A | A | B | A | A | B | B | B | B |
| Ex. 6 | 2.2 | A | A | A | A | B | A | A | B | B | B | B |
| Ex. 7 | 2.2 | D | A | B | B | B | B | B | B | B | B | B |
| Ex. 8 | 2.2 | A | A | A | A | A | A | A | A | A | A | A |
| Ex. 9 | 2.2 | A | A | A | A | B | A | A | A | B | B | B |
| Ex. 10 | 2.2 | A | D | A | A | A | A | A | A | A | A | A |
| Ex. 11 | 2.2 | A | A | A | B | B | A | B | B | A | A | A |
| Ex. 12 | 2.2 | A | A | A | A | A | A | A | A | B | B | B |
| Ex. 13 | 2.2 | A | A | A | A | A | A | A | A | B | B | B |
| Ex. 14 | 2.2 | A | A | A | B | B | A | B | B | A | A | A |
| Co. Ex. 1 | 12.8 | A | D | A | A | A | A | A | A | A | A | A |
| Co. Ex. 2 | 11 | A | B | D | D | D | D | D | D | D | D | D |
| Co. Ex. 3 | 2.2 | A | A | B | D | D | B | D | D | A | A | A |
| Co. Ex. 4 | 2.2 | A | D | D | D | D | D | D | D | D | D | D |
| Co. Ex. 5 | 12.8 | A | D | A | A | A | A | A | A | A | A | A |
| Co. Ex. 6 | 11 | A | B | D | D | D | D | D | D | D | D | D |
| Co. Ex. 7 | 2.2 | A | A | A | B | C | A | B | C | B | B | C |
| Co. Ex. 8 | 2.2 | A | D | A | B | C | A | B | B | A | A | A |
| Co. Ex. 9 | 2.2 | A | A | A | C | C | A | C | C | A | A | A |
| Co. Ex. 10 | 2.2 | A | A | A | B | C | A | B | C | B | B | C |

*1 OTR cc/m$^2$ · day · atm.
*2 Layer constitution, paper/AD/EVOH/AD = 100/25/5/25 μm in thickness.

INDUSTRIAL APPLICABILITY

According to the invention, provided are multilayer structures with good interlayer adhesiveness, methods for producing them, and resin compositions suitable to them. The multilayer structures are produced through co-extrusion of a multilayer melt that comprises a layer of an ethylene-vinyl alcohol copolymer (EVOH) resin composition and a carboxylic acid-modified polyolefin resin layer adjacent thereto, and they have the advantages of improved thermal stability (long-run workability) in their production, especially in producing them through co-extrusion at high temperatures, and improved co-extrusion molding stability especially in high-speed molding lines. The multilayer structures are useful as various containers. In particular, they can be worked into cartons, cups and other containers in which various beverages and others can be stored for a long period of time.

What is claimed is:
1. A multilayer structure produced through co-extrusion of a multilayer melt that comprises a layer of an ethylene-vinyl alcohol copolymer resin composition containing from 100 to 5000 ppm, in terms of boric acid ($H_3BO_3$), of a boron compound, from 100 to 1000 ppm, in terms of the free acid, of a carboxylic acid and/or its salt, and from 50 to 300 ppm, in terms of the metal, of an alkali metal salt, and having an ethylene content of from 25 to 45 mol % and a degree of saponification of at least 99%, and a layer of a carboxylic acid-modified polyolefin resin adjacent thereto.

2. A multilayer structure produced through co-extrusion of a multilayer melt that comprises a layer of an ethylene-vinyl alcohol copolymer resin composition containing from 10 to 50 ppm, in terms of the metal, of a salt of a metal of Group 2 of the Periodic Table, and having an ethylene content of from 25 to 45 mol % and a degree of saponification of at least 99%, and a layer of a carboxylic acid-modified polyolef in resin adjacent thereto.

3. The multilayer structure as claimed in claim 2, wherein the ethylene-vinyl alcohol copolymer resin composition contains from 100 to 5000 ppm, in terms of boric acid ($H_3BO_3$), of a boron compound.

4. The multilayer structure as claimed in claim 2 or 3, wherein the ethylene-vinyl alcohol copolymer resin composition contains from 100 to 1000 ppm, in terms of the free acid, of a carboxylic acid and/or its salt.

5. The multilayer structure as claimed in claim 2, wherein the ethylene-vinyl alcohol copolymer resin composition contains from 50 to 300 ppm, in terms of the metal, of an alkali metal salt.

6. The multilayer structure as claimed in claim 1, wherein the carboxylic acid or a salt thereof or both in the ethylene-vinyl alcohol copolymer resin composition is acetic acid or a salt thereof or both.

7. The multilayer structure as claimed in claim 1, wherein the ethylene-vinyl alcohol copolymer resin composition contains from 10 to 200 ppm, in terms of phosphoric acid ($H_3PO_4$), of a phosphoric acid compound.

8. The multilayer structure as claimed in claim 1, wherein the ethylene-vinyl alcohol copolymer resin composition has a melt index (at 190° C. under a load of 2160 g) of between 3 and 15 g/10 min.

9. The multilayer structure as claimed in claim 1, wherein the ethylene-vinyl alcohol copolymer resin composition has a decomposition point (JISK 7120) of between 350 and 400° C.

10. The multilayer structure as claimed in claim 1, wherein the ethylene-vinyl alcohol copolymer resin composition layer has a thickness of from 2 to 30 $\mu$m.

11. The multilayer structure as claimed in claim 1, wherein the carboxylic acid-modified polyolefin resin has a density of from 0.88 to 0.94 g/cm$^3$, and a melt index (at 190° C. under a load of 2160 g) of between 3 and 15 g/10 min.

12. The multilayer structure as claimed in claim 1, which is produced through co-extrusion coating of the multilayer melt onto a substrate.

13. The multilayer structure as claimed in claim 12, wherein the substrate is paper.

14. The multilayer structure as claimed in claim 1, through which the oxygen transmission rate at 20° C. and 65% RH falls between 1 and 10 cc/m$^2$·day·atm.

15. A process for producing the multilayer structure of claim 1, wherein the take-up speed for co-extrusion is at least 100 m/min.

16. A process for producing the multilayer structure of claim 1, wherein the die temperature for co-extrusion is at least 240° C.

17. An ethylene-vinyl alcohol copolymer resin composition containing from 100 to 5000 ppm, in terms of boric acid ($H_3BO_3$), of a boron compound, from 100 to 1000 ppm, in terms of the free acid, of a carboxylic acid and/or its salt, and from 50 to 300 ppm, in terms of the metal, of an alkali metal salt, and having an ethylene content of from 25 to 45 mol % and a degree of saponification of at least 99%.

18. An ethylene-vinyl alcohol copolymer resin composition containing from 100 to 5000 ppm, in terms of boric acid ($H_3BO_3$), of a boron compound, and from 10 to 50 ppm, in terms of the metal, of a salt of a metal of Group 2 of the Periodic Table, and having an ethylene content of from 25 to 45 mol % and a degree of saponification of at least 99%.

19. The resin composition as claimed in claim 18, which contains from 100 to 1000 ppm, in terms of the free acid, of a carboxylic acid and/or its salt.

20. The resin composition as claimed in claim 18, which contains from 50 to 300 ppm, in terms of the metal, of an alkali metal salt.

21. The resin composition as claimed in claim 17, wherein the carboxylic acid or salt thereof or both is acetic acid or a salt thereof or both.

22. The resin composition as claimed in claim 17, which contains from 10 to 200 ppm, in terms of phosphoric acid ($H_3PO_4$), of a phosphoric acid compound.

23. The resin composition as claimed in claim 17, of which the melt index (at 190° C. and under a load of 2160 g) is between 3 and 15 g/10 min.

24. The resin composition as claimed in claim 17, of which the decomposition point (JISK 7120) is between 350 and 400° C.

25. The resin composition as claimed in claim 17, of which the water content falls between 0.02 and 0.15% by weight.

26. The resin composition as claimed in claim 17, which is for co-extrusion.

27. A multilayer structure having at least one layer of the resin composition of claim 17.

28. The multilayer structure as claimed in claim 27, which has at least one carboxylic acid-modified polyolefin resin layer adjacent to the resin composition layer.

29. The multilayer structure as claimed in claim 27, in which the thickness of the resin composition layer falls between 2 and 30 $\mu$m.

* * * * *

UNITED STATES PATENT AND TRADEMARK OFFICE
CERTIFICATE OF CORRECTION

PATENT NO. : 6,242,087 B1  Page 1 of 1
DATED : June 5, 2001
INVENTOR(S) : Kawai

It is certified that error appears in the above-identified patent and that said Letters Patent is hereby corrected as shown below:

<u>Title page,</u>
Item [22], the PCT Filing Date is incorrect, should read as follows:

-- [22] PCT Filed:  Oct. 5, 1999 --

Signed and Sealed this

Nineteenth Day of February, 2002

Attest:

JAMES E. ROGAN
*Attesting Officer*  *Director of the United States Patent and Trademark Office*